United States Patent [19]
Lofgren et al.

[11] Patent Number: 5,354,084
[45] Date of Patent: Oct. 11, 1994

[54] HAND PROPULSION AND STEERING DAMPENING FOR THREE-WHEEL VEHICLE

[76] Inventors: Michael Lofgren; Brian Stewart, both of 20589 SW. Elkhorn Ct., Tualatin, Oreg. 97062

[21] Appl. No.: 884,524

[22] Filed: May 15, 1992

[51] Int. Cl.[5] .............................................. B62M 1/14
[52] U.S. Cl. ..................................... 280/250; 280/266; 280/271; 280/272
[58] Field of Search .................. 280/242.1, 249, 250, 280/288.1, 265, 266, 271, 272

[56] References Cited

U.S. PATENT DOCUMENTS

| | | | |
|---|---|---|---|
| 1,565,817 | 12/1925 | Schimmel | 280/265 |
| 2,402,880 | 6/1946 | Estes | 280/212.1 |
| 4,109,927 | 8/1978 | Harper | 280/250 |
| 4,432,561 | 2/1984 | Feikema et al. | 280/266 |
| 4,558,878 | 12/1985 | Motrenec | 280/272 |
| 4,572,535 | 2/1986 | Stewart et al. | 280/266 |
| 5,022,671 | 6/1991 | Jones et al. | 280/271 |
| 5,028,064 | 7/1991 | Johnson | 280/266 |

FOREIGN PATENT DOCUMENTS 0016680 of 1896 United Kingdom ................ 280/266

*Primary Examiner*—Margaret A. Focarino
*Assistant Examiner*—A. M. Boehler

[57] ABSTRACT

A three-wheeled vehicle having a front body member carrying front wheel seat, hand pedals and leg supports pivotally connected to a rear body member carrying the rear wheels and handlebar. The front body member includes a seat for the operator and pedals to be operated by the rider's hands. The seat, pedals, front wheel and leg supports are maintained in a fixed relationship whereby pivoting of the front frame portion simultaneously pivots the seat, pedals, drive line and front wheel to maintain said fixed relationship while turning and supplying power to the front wheel. A stabilizing dampener between front and rear frame sections provides smooth steering and inhibits undesired, inadvertent, side to side movement of the rider's body and thereby repetitive back and forth turning of the vehicle.

5 Claims, 3 Drawing Sheets

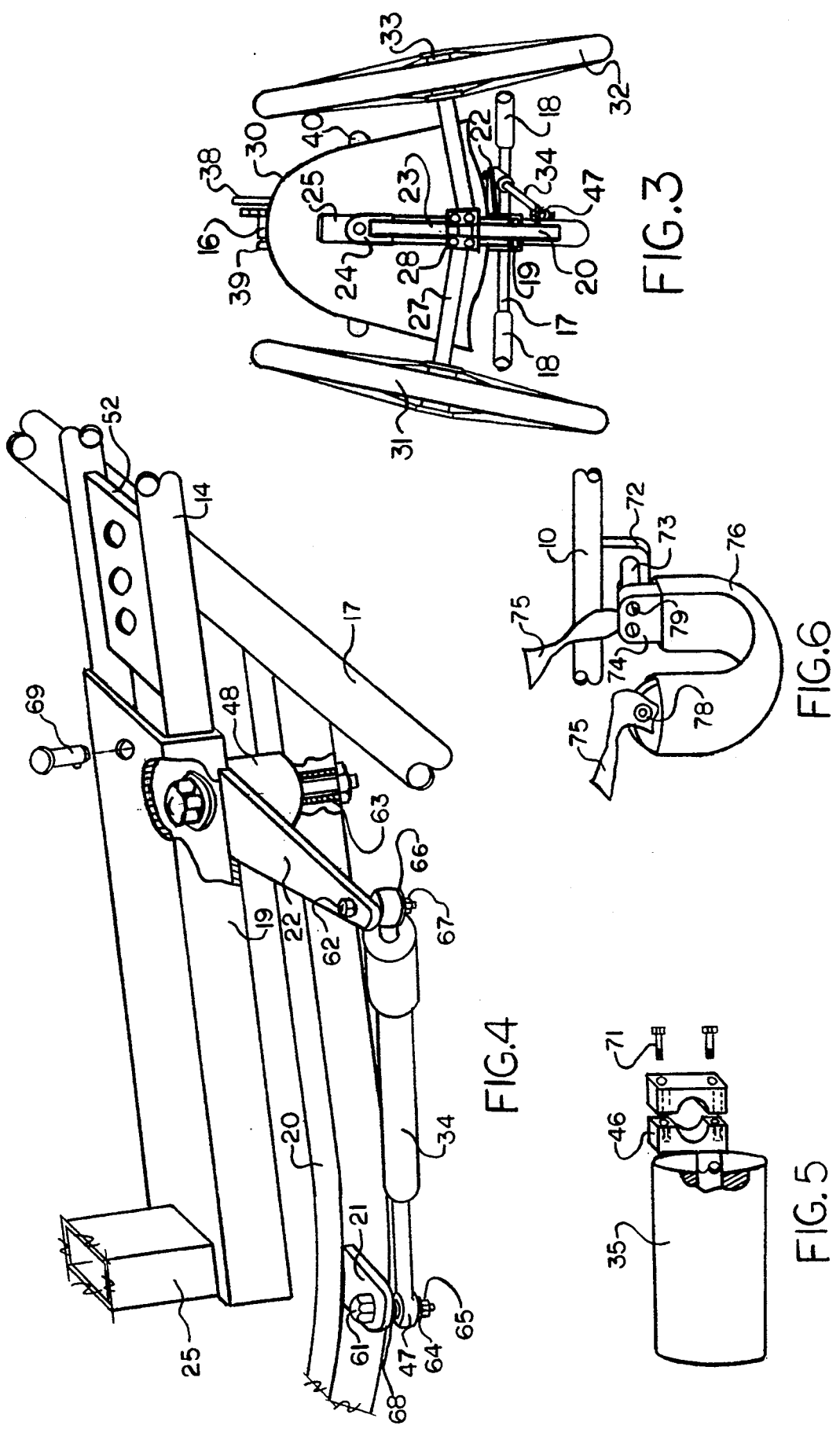

HAND PROPULSION AND STEERING DAMPENING FOR THREE-WHEEL VEHICLE

FIELD OF THE INVENTION

This invention relates to a three-wheel vehicle having independent front and rear frame sections that are pivotally interconnected by front and rear pivots, and more particularly to the inclusion of hand pedals and the necessary supports and components to enable hand propulsion and the inclusion of a hydraulic dampening cylinder attached to each of the independent front and rear frame sections in such a manner as to dampen out any unplanned for articulation or oscillation of the front and rear frame sections with respect to each other. As another aspect of the invention, the hydraulic cylinder attached as above actively controlled by conventional hydraulic pressure and valving systems to enable the rider to actuate the articulation of the frame and effect power steering. In the present embodiment of the invention the cylinder is used to dampen frame response and dissipate the energy of the rider and frame in the event of an unwanted oscillation. This allows the rider to have greater control of the vehicle when turning at increased speeds and prevents a loss of control due to frame oscillation.

BACKGROUND OF THE INVENTION

Three-wheel vehicles based on the concept of articulated frame sections, i.e. a front frame section being pivotable about a rearwardly inclined axis relative to a rear frame section for turning the vehicle, is known, as exemplified by the U.S. Pat. Nos.4,572,535 and 4,789,173 issued to the same inventors hereof. The vehicle of these U.S. Patents functions very well for their intended purpose. However, it is desirable to provide a three-wheel vehicle on which the rider can propel the vehicle with his arms especially in the case of disabled individuals who cannot use their legs and thus cannot ride a conventional bicycle, nor can they balance a conventional bicycle. A hand propelled vehicle that is steered by body-lean is ideal for these individuals. It is also desirable to reduce or eliminate the possibility of oscillation of the rear frame relative to the front frame by attaching a hydraulic dampening cylinder between the front rear frame which controls the speed of frame articulation and absorbs the energy of any dynamic oscillation that may be generated by unplanned for and unwanted oscillation of the front frame relative to the rear frame. The invention is also especially concerned with the comfort of the rider especially the rider without feeling in their legs and includes adjustable, padded intermediate leg supports and U shaped stirrups to support the rider's ankles. The invention herein is directed to the satisfaction of both these objectives.

BRIEF DESCRIPTION OF THE INVENTION

The present invention solves all of the above objectives. Whereas in the prior vehicles, the vehicles were powered by the rider's legs rendering them unusable to rider's without the use of their legs, in the preferred embodiment of the present invention a tripod type support elevates the cranks to a position in front of the rider so that he can easily propel the vehicle by turning a crank with his arms and hands. These crank arms are mounted at the top of the tripod support and a conventional chain and derailleur system connects the crank arms to the front drive wheel. A handbrake is also mounted on the back leg of the support tripod and a cable attaches it to the drum brake in the front hub. Whereas in the prior vehicles the rider powered the vehicle with his legs and feet using conventional foot pedals, in the present embodiment of the present invention the rider must have some means of constraining and support his legs. This is accomplished by the intermediate leg supports and ankle supports that are mounted on each side of the front frame in such a manner to support the rider's legs. The intermediate support is especially important to prevent hyperextension of the rider's knees.

Whereas in the prior vehicles, the rider relied on skill and coordination to control steering and frame response and complete mental and physical faculties to respond to irregularities in the road in the case of the disabled riders they often don't have muscular control varying from their lower abdomen all the way up to their shoulders and thus cannot respond to unanticipated oscillation of the front and rear frames. The present embodiment of the present invention utilizes a hydraulic steering dampener to control the response of the front and rear frames to any unexpected oscillations that may develop from the relative motion of the front and rear frame. It will be appreciated that the hydraulic dampener provides an element of control a stability in and of itself independent of the skill level of the rider. In the present embodiment of the invention a lever arm and the cylinder body and rod extend rearward where it attaches to a lever which projects horizontally outwards from the rear frame section on the central frame member. The cylinder is mounted in such manner that the vehicle can be turned to either extreme without bottoming the cylinder. The hydraulic is bidirectional in its dampening and has no effect on the frame geometry when the vehicle is at rest or there is no relative motion taking place between the front and rear frame and as such does not predispose the steering towards one direction or the other. If the rider is jarred out of control by either a bump in the road or by bad judgment during operation or lack of body control the hydraulic dampener quickly dampens any oscillation and restores control to the rider.

The invention will be more clearly understood and appreciated by reference to the detailed description that follows and the accompanying drawings referred to therein.

DRAWINGS AND DETAILED DESCRIPTION

The following drawings and detailed description are intended to incorporate by reference the figures and drawings of previous U.S. Pat. No. 4,572,535.

FIG. 3 is a back view of the three wheeled vehicle of FIG. 1;

FIG. 4 is a detailed view of the steering stabilizer number 34.

FIG. 5 is a detailed view of the leg support 35.

FIG. 6 is a detailed view of the ankle support 36.

Figure 1:
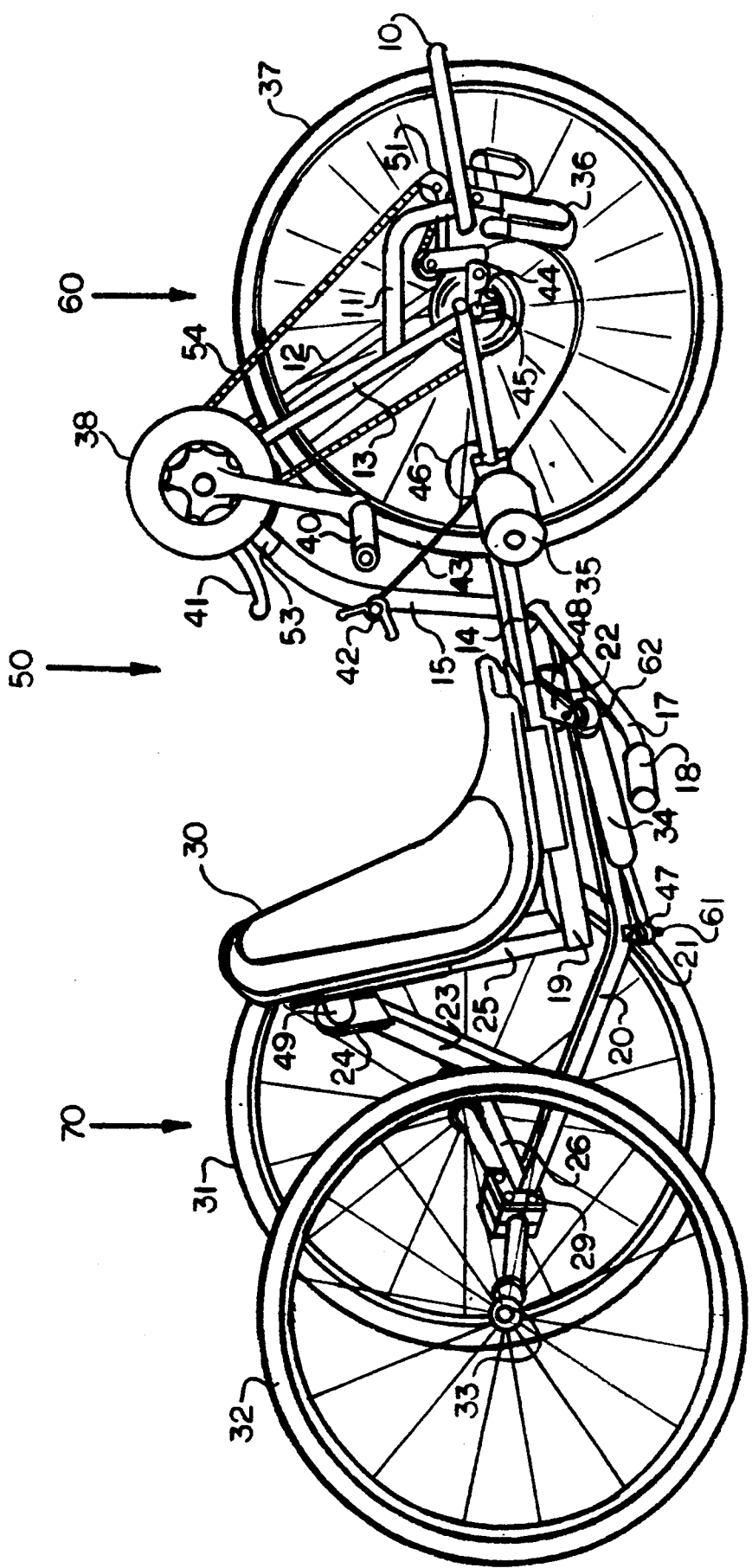
FIG. 1 is a perspective view of the three wheeled vehicle in accordance with the invention.

Referring to the drawing figures, the tricycle 50 of the present invention is comprised of a unified rear body member 70 and a unified front body member 60. The rear body member 70 includes a frame having a slight "V" shaped wheel support 27 attached by two aluminum blocks 28 and four bolts and nuts and lock washers in such a manner that the wheel support 27 is securely clamped in a fixed position relative to the aluminum blocks 28 and then attached to the rear frame at plate 29. By clamping the wheel support 27 to the blocks 28 the rear wheel alignment is adjusted and maintained. To further explain this aspect, rotation of the wheel support 27 with respect to aluminum blocks 28 establishes the rear wheel alignment with regards to toe-in and toe-out. The outer ends of the wheel support 27 receive axles 33 which are rotatably connected to two wheels 31 and 32 which are supported in spaced relationship and adjusted as mentioned above for parallel movement on the ground. In the present invention the rear wheels are attached to the wheel support with quick release axles. A boss is pressed into the outboard ends of each side of the wheel support 27. These bosses may be threaded or are used with the quick release axles and their detent balls for securing the rear wheels. A forwardly projected bar 20 from plate 29 has an upwardly projected bar 26 and a vertical bar 23 welded together to form a rigid L shaped frame. Plate 24 is welded to the upper end of bar 23. Bar 21 is attached to bar 20 on either side but in the present invention on the right side with a vertical hole through the bar near the outboard end. There is a hole through the upper half of plate 24 and hole through the forward end of bar 20 just rearward of its forward end. A first pivotal connection 38 is provided at the forward hole through bar 20 at the forward end, and a second pivotal connection 49 is provided on the upper end of of plate 24 in a position rearwardly and upwardly relative to the first pivotal connection and forward of wheel support bar 27. A handle bar 17 is secured to the end of bar 20 forward of the first pivotal connection and includes a left hand grip 18 and right hand grip 18.

The front body member 60 includes an axle 44 supporting a front wheel 37. A rigid fork shaped support bar 10 straddles the front wheel 37. Two metal plates "drop-outs" 45 are attached to each side of fork 10 in line with and just above the axle bolt 44 with vertical slots that secure axle 44. The right side plate 45 attaches to bar 14 and also supports the lower derailleur 51. The rigid fork support bar 10 begins at the left rear of the front frame 60 and extends forward past the axle 44 and curved around the front wheel 37 and proceeds back toward the rear of the front end on the right side of the wheel and stops just in front of the right axle support 45. Bar 14 begins at the rear of the front frame directly adjacent to bar 10 and proceeds forward parallel to bar 10 in the horizontal plane to just in front of the front axle 44. Plate 52 with a series of holes on ¾ centers is welded between bars 10 and 14 at the rearward end of these bars. This plate begins approximately 3" forward of the beginning of bars 10 and 14 and stops just rearward of the front wheel. Three bars forming a tri-pod attach to the front fork bars 10 and 14 and the plate 52 in the following manner. Bar 15 attaches to plate 52 at its forward end and extends upward and forward and attach to tubing 16. Bar 12 on the left side of the front frame extends upward and rearward from bar 10 and attaches to tubing 16. Bar 13 on the right side of the front frame extends upward and rearward from bar 14 and attaches to tubing 16. Bar 11 extends forward and downward from bar 13 and attaches to bar 10 completing a very rigid frame that effectively comprises the front frame. Crank arms 39 and sprockets 38 are conventionally rotatably secured to tubing 16. Hand pedals 40 are rotatably attached to crank arms 39. Top derailleur 53 is attached to support bar 15 and chain 54 interconnects the crank arms and accompanying sprockets and the axle and the accompanying freewheel. Derailleurs 53 and 51 allow for the transfer of power from the crankarms to the front wheel in a conventional manner providing the capability of differing gear combinations for differing riding situations. The front wheel encompasses a drum brake hub in the front hub which is secured by conventional brake arm to the front frame piece 10 on the left side of the front frame. Lever 41 attached to support bar 15 actuates the brake by conventional cable and housing means. Shift levers 42 attached to the left and right of support bar 15 shift the top and lower derailleur by conventional cable and housing means.

FIG. 5 shows leg supports 35 attached to the front frame by means of movable clamp 46. Clamp 46 consists of two pieces of aluminum which are held together by two bolts 71 which thread into the clamp 46. The aluminum clamps 46 are split vertically and each side has a cylindrical indentation whose radius closely matches the radius of front frame tubes 10 and 14. One side of the clamps 46 is attached to a cylindrical bar 35 projecting away form the clamp and perpendicular to the front frame. A cylindrical padding material is attached to this projecting cylinder. Both clamps 46 encircle the front frame bars 10 and 14 with enough space between themselves that when the two bolts and nuts are tightened the assembly is clamped in place. This assembly is thus held rigidly in place but can be moved to the location of preference.

FIG. 6 shows U-shaped bar 36 attached to the front frame member 10 forward of the axle 44. Padding material 76 is secured to the U-shaped bar 74 and VELCRO hook-and-loop fastening material 75 is secured to the outside extension of the U shaped bar at the top by means a pop rivet 78 and sandwiched between support 74 and spacers 73. Two screws 79 and nuts secure the support 74 to plate 72 on the front frame section 60. The screw 79 passes through the inside leg of the U 74 through the spacer 73 through the VELCRO 75 through the plate 72 and is secured by a nut.

Support bars 10 and 14 project rearwardly of the wheel 37 and are telescopingly interconnected to an L shaped section having a lower leg 19 and upper leg 25. It will be appreciated that, whereas support bars 10 and 14 as a unit can be adjusted forwardly and rearwardly relative to this L shaped section (to adjust to the rider's body and leg length) these sections of the front body member are interlocked during the riding operation of the tricycle. FIG. 4 illustrates the telescoping relationship of the rear section of support bars 10 and 14 and the lower bar 19 of the L shaped section which are secured together as by engagement of the ball detent pin 69 and the corresponding holes in the lower L bar 19 in plate 52. Plate 22 projects outwardly to the right perpendicular to bar 19 in the horizontal plane. Hydraulic cylinder 34 is pivotally connected between plates 22 and 21 by means of conventionally accepted nuts, bolts and hardware.

A seat and backrest 30 are fastened with a bolt at the upper rear of the seat and by means of a "c" channel shape at the bottom of the seat which fits snugly over the bottom L bar 19. The forward end of leg 19 is connected by pivotal connection 48 to bar 20 of the rear body member, and the upper end of leg 25 is connected by pivotal connection 49 to the plate 24 of the rear body member.

FIG. 4 in particular illustrates the pivotal connection between the front 60 and rear frame section 70 including the hydraulic dampener 34 the plate 21 connecting the dampener to the rear frame 20 the spherical ball joint on 47 the end of the dampener 34 where it attaches to the rear frame section 70, the connecting bolts, nuts and washers 61 and 62 and the rubber bushing 48 and the bolt 62, washers 66, nut 67 and sleeve 63 where the front frame section 60 attaches to the rear frame section 70 at the lower forward pivotal point 48. A bolt 61 passes through plate 21 on the rear frame and a washer 68 beneath the plate and then through spherical ball joint 47 anchor washer 64 and then a nut 65 is placed on the bolt to secure the assembly. On the other end of the hydraulic dampener 34 a bolt 62 passes through plate 22 which is attached to the front frame section 60 on bar 19 and passes through the bushing in the end of the dampener through a washer 66 and a nut 67 which holds the assembly securely.

Bar 25 of the front frame section 60 extends upwardly and rearwardly from bar 19 to a second pivot point 29 similarly to a lower pivot point 48 comprised of a bolt passing through a washer then through the rear of bar 25, through the rubber busting 49 through plate 24 attached to rear frame section 70 through a washer and secured by a nut.

Handle bar 17 and hand grips 18 are attached to rear frame member 20.

OPERATION

Reference is now made to FIG. 1 illustrating the side view of the vehicle. It will be appreciated that the rider sits in seat 30 with his legs directed forward and resting on leg supports 35 and ankle supports 36. It will also be appreciated that the rider uses the hand cranks 39 to provide power to the front wheel and the brake lever 41 to apply braking also to the front wheel. This vehicle is especially suited to use by those individuals who have lost the control of their legs, have balance problems, have lost the use of their abdominal muscles upwards to their shoulders. The seat, hand cranks, leg supports, ankle supports cradle the rider in the front frame section and greatly facilitate the operation of the vehicle as well as provide for rider comfort. The leg supports 35 in particular keep the rider's legs from spasming and hyper extending at the knee. Obviously adjustment of the detect pin 69 passing through the hole in the forward projection of bar 19 as shown in FIG. 4 and the plate 52 on t front frame section 60 enables the rider to choose a leg and arm length that bests his size.

Figure 2:
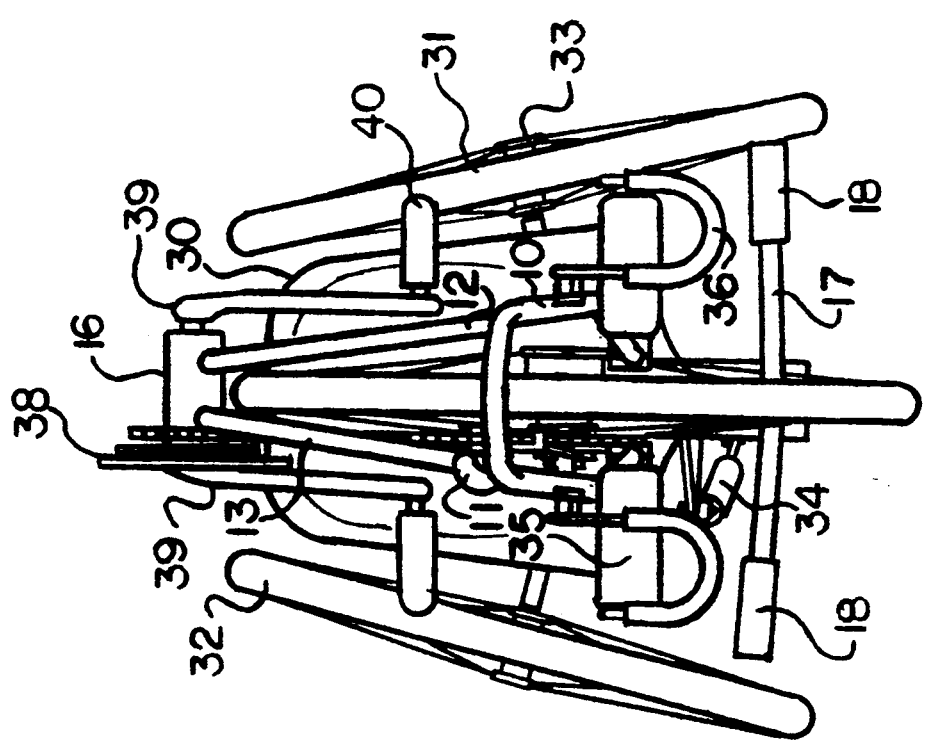
FIG. 2 is a front view of the three wheeled vehicle of FIG. 1.

Turning of the vehicle to the right is initiated by the rider leaning his upper body to the right. Of special interest is the rigid connection between the crank arms and the front wheel as created by the tripod structure of the supports that attach to the bearing assembly 16 as shown in FIG. 2. This is especially important when delivering power to the front wheel while turning. The leaning action of the rider induces pivoting of the front frame. Relaxing of the rider to the neutral position returns the front frame to the neutral steering position and the vehicle proceeds straight ahead. The rider leaning to the left and to the right initiates the turning of the vehicle. This turning left and right causes the front frame section to oscillate with respect the rear section. This oscillation is fine when done in a controlled rider manner initiated by the rider but will disrupt control of the vehicle when it is initiated by a bump in the road or by an inexperienced rider or by excessive speeds in combination with either of the above. The dynamics of this type of steering is very complex and third are many potential events that might trigger an unwanted and unanticipated oscillation of the front frame relative to the rear frame. This condition may lead to a high speed wobble. The present embodiment of the invention provides for a hydraulic dampener 34 to be attached between the front 60 and rear frame section 70 with the express purpose of dampening and elimination any unwanted frame oscillation between the front and rear frame. While the dampener both restricts accelerated movement between the front frame as well as dissipating the energy of any oscillation that may be initiated it does not adversely effect the turning of the vehicle when it is being ridden as intended through levels of performance from very slow to very fast. The dampener provides the feeling of control to the rider and smooths of steering which is very desirable.

The invention disclosed herein is believed to substantially improve the usability of three-wheel vehicles. Basically, the concept is dependent on the ability of the rider to use his hands to power the vehicle while supporting his legs and feet in a manner that he or she is unable to do without supports 35 and 26 because the riders generally have no control of their abdominal and leg muscles. The concept is also dependent on the hydraulic dampener's ability to eliminate any unwanted oscillation of the front frame section and the rear frame section with respect to each other causing what would generally be called a "wobble", "speed wobble" or "high speed" or "high speed wobble" thus causing the rider to lose control of the vehicle.

A further major modification would be to pressurize the hydraulic cylinder by means of a pressurized hydraulic system with valving, pumps and the appropriate controls to allow the rider to control the action of the cylinder and rod extension to initiate relative movement of the front frame relative to the rear frame and thus actively initiate the steering of the vehicle. It would still provide the control of the relative movement of the front frame with respect to the rear frame and eliminate any unwanted oscillation but would allow the control of steering by people with even greater injuries than those who presently use the vehicle as equipped with a hydraulic dampener.

These and other variations are contemplated as being encompassed by the invention, the specific definitions of which is incorporated in the claims appended hereto.

We claim:

1. A three-wheel vehicle comprising:
  a front frame portion and a rear frame portion, said front frame portion and said rear frame portions assembled together in overlapping relation, a front pivot and rear pivot elevated relative to the front pivot cooperatively connecting the front and rear frame portions whereby the front frame portion pivots relative to the rear frame portion around an inclined axis, front to rear,
  a single front wheel mounted on the front frame portion and a pair of wheels mounted on the rear frame portion whereby pivoting of the front frame portion relative to the rear frame portion causes pivoting of the front frame portion and the front wheel for turning the vehicle,
  a seat is provided on the front frame portion, pedals are provided on the front frame portion and a drive line extends between the front wheel and pedals, said pedals have a pedal axis of rotation, said pedal axis is positioned rearward of a front wheel axle to make the pedals accessible to a rider seated in the seat, and said seat, pedals, drive line and front wheel have a fixed relationship during operation of said vehicle whereby pivoting of the front frame portion simultaneously pivots the seat, pedals, drive line and front wheel to maintain said relationship, and a stabilizing dampener between said front and rear frame portions to inhibit undesired inadvertent side-to-side movement of rider's body and thereby repetitive back and forth turning of the vehicle.

2. A three-wheel vehicle as defined in claim 1 wherein said inclined axis is directed downwardly through a plane defined by the contact points of the front and rear wheels with the ground, said axis directed through the plane rearwardly of the contact point of said front wheel and forwardly of the contact point by said rear wheels, thereby providing articulated turning of said vehicle as the front frame portion pivots relative to the rear frame portion.

3. A three-wheel comprising:

a front frame portion and a rear frame portion, said front frame portion and said rear frame portions assembled together in overlapping relation, a front pivot and rear pivot elevated relative to the front pivot cooperatively connecting the front and rear frame portions whereby the front frame portions pivots relative to the rear frame portion around an inclined axis, front to rear;

a single front wheel mounted on the front frame portion and a pair of wheels mounted on the rear frame portion whereby pivoting of the front frame portion relative to the rear frame portion causes pivoting of the front frame portion and the front wheel for turning the vehicle;

a seat provided on the front portion, pedals provided on the front frame portion and a drive line extending between the front wheel and pedal, said pedals accessible to a rider seated in the seat, and said seat, pedals, drive line and front wheel having a fixed relationship during operation of said vehicle whereby pivoting of the front frame portion simultaneously pivots the seat, pedals, drive line and front wheel to maintain said relationship; and said seat arranged on said front frame portion, and said pedals having a pedal axis positioned rearward of a front wheel axle to make the pedals accessible to the rider's hands for pedaling with the rider's hands, and supports provided on said front frame portion for supporting the rider's legs, said supports also having a fixed relationship with said front frame portion.

4. A three-wheel vehicle as defined in claim 3 wherein said inclined axis is directed downwardly through a plane defined by the contact point of the front and rear wheels with the ground, said axis directed through the plane rearwardly of the contact point of said front wheel an forwardly of the contact points by said rear wheels, thereby providing articulated turning of said vehicle as the front frame portion pivots relative to the rear frame portion.

5. A three-wheel vehicle comprising:

a front frame portion and rear frame portion, said front frame portion and said rear frame portions assembled together in overlapping relationship, a front pivot and a rear pivot elevated relative to the front pivot cooperatively connecting the front and rear frame portions whereby the front frame portion pivots relative to the rear frame portion around an inclined axis, front to rear;

a single front wheel mounted on the front frame portion and a pair of wheels mounted on the rear frame portion whereby pivoting of the front frame portion relative to the rear frame portion causes pivoting of the front frame portion and the front wheel for turning the vehicle;

a seat provided on the front frame portion, pedals provided on the front frame portion and a drive line extending between the front wheel and pedals, said pedals accessible to a rider seated in the seat, and said seat, pedals, drive line and front wheel having a fixed relationship during operation of said vehicle whereby pivoting of the front frame portion simultaneously pivots the seat, pedals, drive line and front wheel to maintain said relationship; and said seat arranged on said front frame portion relative to the inclined axis to place a rider's weight in part below said inclined axis, and a stabilizing dampener between said front and rear frame portions to inhibit undesired inadvertent side-to-side movement of a rider's body and thereby repetitive back and forth turning of the vehicle, said pedals having a pedal axis positioned rearward of a front wheel axle to make the pedals accessible located for accessibility to the rider's hands for pedaling with the rider's hands, and supports provided on said front frame portion for supporting the rider's legs, said supports also having a fixed relationship with said front frame portion.

* * * * *